US005741166A

United States Patent [19]

Newman

[11] Patent Number: 5,741,166

[45] Date of Patent: Apr. 21, 1998

[54] ELECTRICALLY CONTROLLED HYDRAULIC POWER BOAT CONTROLS

[76] Inventor: James O. Newman, 920 Iris Dr., Delray Beach, Fla. 33483

[21] Appl. No.: 524,587

[22] Filed: Sep. 8, 1995

[51] Int. Cl.[6] .................................... B60K 41/00

[52] U.S. Cl. .................................... 440/84

[58] Field of Search .................... 192/3.58; 440/61, 440/53, 84–87; 114/150; 91/361, 459, 275, 363 R, 42, 248

[56] References Cited

U.S. PATENT DOCUMENTS

| | | | |
|---|---|---|---|
| 2,714,874 | 8/1955 | Hart | 91/361 |
| 3,488,954 | 1/1970 | Thomas et al. | 114/150 |
| 4,698,035 | 10/1987 | Ferguson . | |
| 4,718,869 | 1/1988 | Fisher . | |
| 4,739,236 | 4/1988 | Burkenpas . | |
| 5,280,282 | 1/1994 | Nagafusa et al. . | |
| 5,318,466 | 6/1994 | Nagafusa . | |
| 5,408,230 | 4/1995 | Okita . | |
| 5,505,641 | 4/1996 | Onoue | 440/61 |

*Primary Examiner*—Edwin L. Swinehart
*Attorney, Agent, or Firm*—Oliff & Berridge

[57] ABSTRACT

One or more helm stations are provided to remotely control the engine, transmission and steering functions of a boat or ship. Multiple station remote helms, either portable or stationary, include electric switches that, when closed, energize solenoids and relays to control single or multiple engine throttles, transmissions, ignition, starting, stopping and steering functions of a boat or ship. These switch groups are placed in any location on the vessel or may be mounted on a hand held portable unit which is plugged into various locations where matching receptacles are placed. The throttle, transmission shifting and steering movement is provided by hydraulic cylinders, with fluid pressure supplied by electrically powered hydraulic pumps. The fluid supply to these cylinders is controlled by electric solenoid operated valves, which in turn are activated by the electric helm switches. The ignition and starting functions of the engines are energized by relays, which in turn are closed or opened by any of the multiple helm switches.

7 Claims, 11 Drawing Sheets

ISS IDLE SWITCH, STARBOARD

ELECTRICALLY CONTROLLED HYDRAULIC POWER BOAT CONTROLS

BACKGROUND OF THE INVENTION

1. Field of the Invention

The present invention relates to a boat control system. More specifically, the invention relates to multiple station remote helms that are either portable or stationary and that include electric switches for controlling electric power supplied to electric solenoid valves that in turn control the flow of hydraulic fluid to hydraulic cylinders, which activate single or multiple engine throttles, transmissions, and steering functions of a boat or ship. The remote helms also control through electric relays the ignition, starting, and stopping functions of the boat or ship 2. Related Art Remote boat and ship engine controls currently in use include mechanical connections with cables, bowden wire, rods and other mechanical means, electric and electronic systems with servo motors or solenoids, pneumatic, manual hydraulic and hydraulic power assisted mechanical devices. Most of these systems have limitations as to total number of stations, physical location of helms, ability to provide fine control, physical ease of operation and responsiveness to movement of levers. Existing systems for the remote control of boats and ships use control levers, and the location of these control levers determines the position of throttle and transmission controls. The use of remote levers to position throttle levers to control engine speed requires the operator to be precise in the movement of the remote control lever to finely adjust the engine speed. The various mechanical or manual hydraulic methods used in existing boat control systems make precise movement of the control levers difficult as a result of the friction resistance that is generated. Multiple stations multiply the friction resistance, making precise control even more difficult. Existing electric and pneumatic systems do not provide precise response at the engine relative to the movement of the control lever, thereby resulting in over and under control. The use of a single control lever to control both transmission and throttle functions of an engine multiplies the difficulty by reducing the effective travel range of the throttle control lever to a fraction of that of a dedicated control lever for the throttle.

SUMMARY OF THE INVENTION

In accordance with one aspect of the present invention, multiple portable or stationary remote helms are provided that include electric switches to control single or multiple engine throttles, transmissions, ignition, starting, stopping and steering functions of a boat or ship. These electric switches may be located permanently in any location on the vessel or may be mounted in a hand held portable unit which can be connected by flexible, multiple conductor cable to various locations throughout the vessel where multiple conductor plug-in receptacles are placed. A selector switch insures that only one designated station can be operated at a time and power is disconnected to all others.

The throttle control, transmission shifting and steering movement are provided by hydraulic cylinders which receive fluid pressure supplied by electrically powered hydraulic pumps. The fluid supply to these cylinders is controlled by electric solenoid operated hydraulic valves, which are activated by the electric helm switches. The ignition, starting and shut down functions of the engines are energized by relays which are closed by any one of the multiple helm switches that are in an active status.

The use of one lever to control both throttle and shifting simplifies operation and eliminates the possibility of engaging or disengaging the forward or reverse gears when the engine is not at idle. The engaging or disengaging of these gears when the engine is at high speed can cause severe damage to the transmission and possibly the engine. The major disadvantage of using a single lever for control of both the throttle and transmission shifting is the reduction of travel of the lever to accommodate the five position ranges of neutral, forward, forward throttle, reverse and reverse throttle. This reduction in travel of the control lever during throttle control decreases the precision of control obtainable by the throttle lever.

The response of the engine throttle lever is proportionally much greater than that of a lever dedicated to throttle control alone. Precise control of throttle speed is especially important at slow and trolling engine speeds and when synchronizing engine speeds of multiple engines.

According to one embodiment of the present invention, a boat control station includes electrical switches for control of the supply of electricity to electric solenoid operated hydraulic valves. The electrically controlled hydraulic solenoid valves control the flow of hydraulic fluid from hydraulic pumps to hydraulic control cylinders having double acting pistons. Extension and retraction of the double acting pistons causes reciprocal movement of a control rod that moves a throttle lever and also activates additional control switches. These additional control switches also control the flow of electricity to the electric solenoid operated hydraulic valves, thereby controlling movement of the double acting control cylinders.

The use of momentary contact switches or spring loaded micro switches at the boat control station during throttle control provides a means to relay a short term electrical signal to the solenoid operated hydraulic valves, thereby only opening the solenoid valves for a short period of time to the flow of hydraulic fluid and resulting in a minimal movement of the throttle control cylinder. The degree of movement of the throttle control cylinder is determined by the amount of time the switch is held closed and therefore the amount of time the solenoid valve is open to the flow of hydraulic fluid. Therefore, movement of the throttle control cylinder is not sensitive to the position of a lever as is the case with prior art systems.

In a boat control system according to an embodiment of the present invention, relatively low hydraulic pressure (approximately 35 psi), large diameter control cylinders, and flow control valves create the ability to move the throttle levers smoothly, slowly and precisely. The throttle control has two fluid flow ranges, one for slow and precise control and one for more rapid movement of the engine throttle control. A low fluid flow to the control cylinders created as a result of flow restrictions in the fluid lines provides precise control and a high fluid flow permits fast acceleration and deceleration.

The piston of a double acting hydraulic control cylinder is locked in place, thus preventing movement of the connected throttle or transmission shift lever, when the solenoid operated hydraulic valve assembly that controls the supply and exhaust of hydraulic fluid to and from the control cylinder is in a center blocked position.

A higher pressure (approximately 65 psi) hydraulic fluid is used for the activation of the transmission shift control cylinder to provide faster movement and greater positive pressure to hold the shift lever in the desired extended or retracted position. A shift switch located at a remote helm or boat control station is activated to one of two closed positions in order to place the transmission in either a forward or reverse position, thereby powering a solenoid operated hydraulic valve to a position that supplies constant pressure hydraulic fluid to one side of the double acting transmission shift control cylinder and exhausts hydraulic fluid from the other side of the cylinder. Activation of the shift switch to a closed position therefore results in the cylinder being extended or retracted. When the shift switch is in a neutral, open position, blocked ports in the solenoid operated hydraulic valve or in-line check valves lock the piston of the transmission shift control cylinder in a central location for establishing the neutral position of the transmission.

In one embodiment of the present boat control system, control of the vessel is achieved with a small hand-held helm unit containing switches, which is connected by multiple conductor cable to any desired location on the vessel having a matching receptacle. Fixed control stations of any number can also be provided at various locations throughout the vessel with similar momentary contact switches or a single or dual lever control having guide operated micro switches. Hydraulic pressure for activation of the hydraulic control cylinders is supplied by an electrically driven hydraulic pump that is controlled by a pressure switch to maintain the desired pressure range. An accumulator is installed in the pressure line in order to keep a constant pressure range and reduce cycling of the pump. A pressure relief valve protects the system against build up of excessive pressure.

A separate pressure reducing valve for each engine in a dual engine system lowers the control pressure (to approximately 65 psi) below that of the supply pressure (approximately 125 psi) to provide an equal and separate fluid pressure source for the controls of each engine so that the hydraulic control cylinders do not sequence and the engines will respond simultaneously. Additional pressure reducing valves are installed in each throttle control line to further reduce the hydraulic fluid pressure and the resulting activation speed of the throttle control cylinders. A flow control valve in the same throttle control line reduces the throttle control cylinder activation speed even more. A solenoid valve in the throttle control line can be opened to bypass the flow control valve to increase the flow of hydraulic fluid to the throttle control cylinder, thereby allowing for quicker throttle response.

Separate switches are provided at the remote helm stations in order to allow the operator to choose either slow and precise control of the throttle cylinder and therefore slow throttle movement speed as a result of directing the hydraulic fluid through a flow control valve for fine engine speed adjustment; or rapid control of the throttle cylinder and therefore fast throttle movement speed as a result of bypassing the flow control valve for quick engine speed response. The throttle and transmission shift electric control circuits are interlocked to prevent shifting of the transmission in or out of gear unless the throttle is in an idle position to prevent damage to the engine or transmission.

BRIEF DESCRIPTION OF THE DRAWINGS

FIG. 13 is a cross sectional view taken in the direction of arrows 13B—13B in FIG. 13A.

SUMMARY OF THE INVENTION

Figure 1:
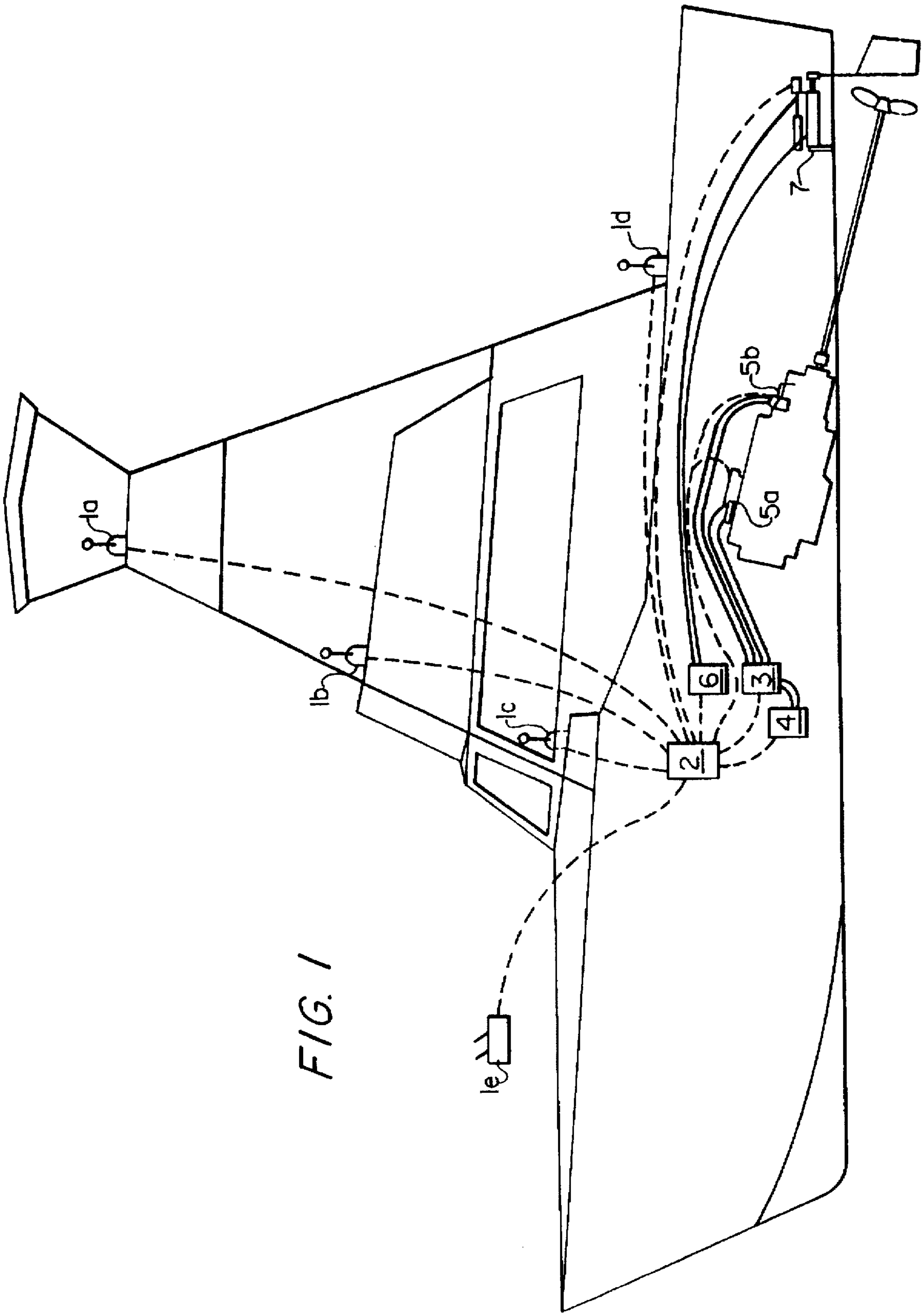
FIG. 1 is a schematic diagram showing the arrangement and operation of one embodiment of the present boat control system on a boat or ship.

A boat control system according to one embodiment of the present invention has 7 basic components as shown in FIG. 1:

(1) Helm stations located in various areas of the vessel composed of electrical switches and associated hardware.

(2) Electrical panel to connect throttle and transmission shift control valves, steering and ignition and start and stop functions to the helm.

(3) A hydraulic pump assembly to provide fluid pressure to the throttle and transmission shift valve assemblies.

(4) Valve assemblies for the control of throttle and transmission shift control cylinders.

(5) Throttle and shift control cylinder assemblies.

(6) Hydraulic pump assembly to supply fluid pressure to the steering cylinder.

(7) Steering control cylinder assembly.

GENERAL SUMMARY OF OPERATION

Figure 2:
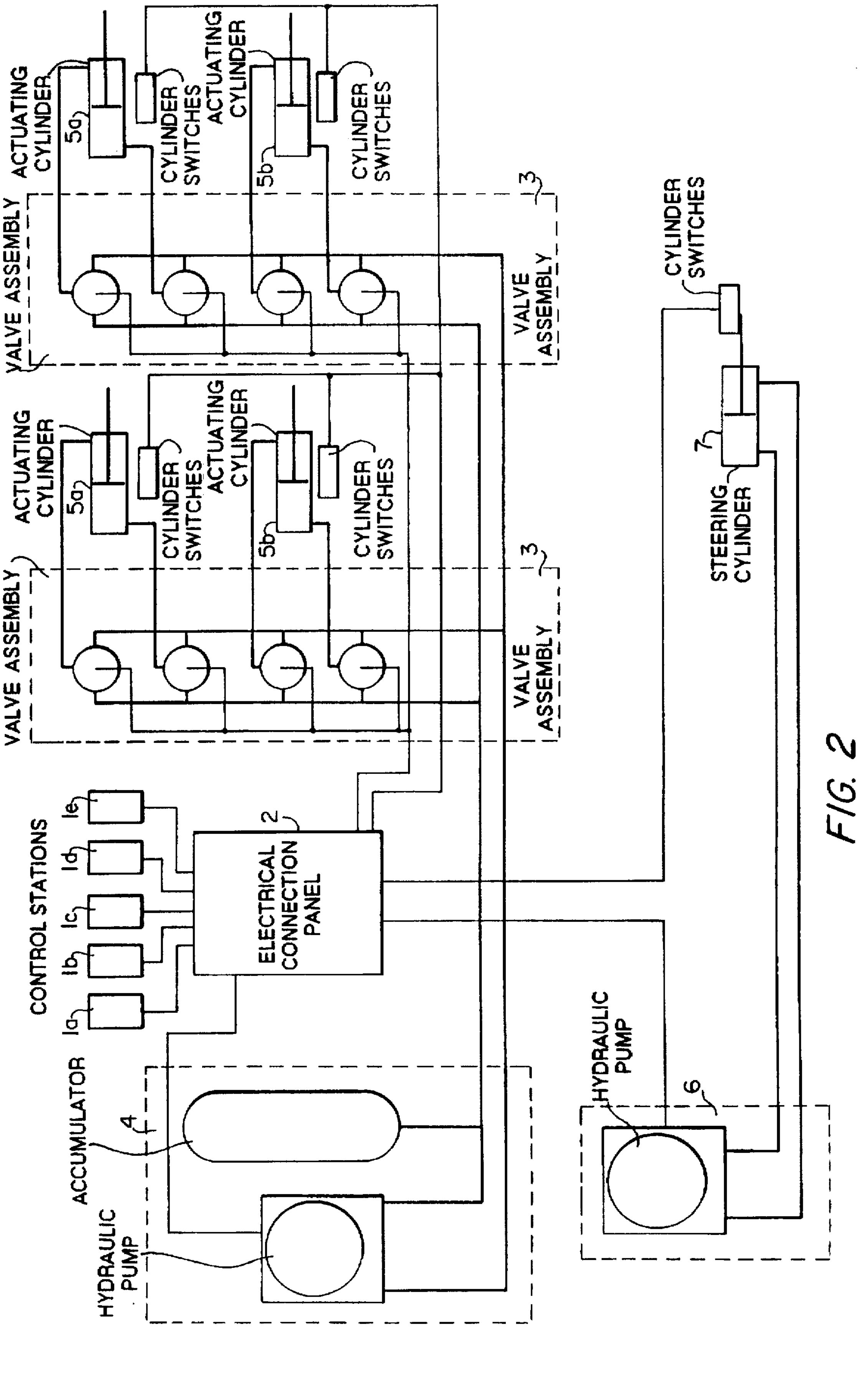
FIG. 2 is an electrical and hydraulic schematic diagram showing the interconnection of components in one embodiment of the control system.

FIG. 1 illustrates the basic components of a boat control system according to one embodiment of they would be invention as they would be installed on a vessel. FIG. 2 is an electrical and hydraulic schematic diagram showing the interconnection of the various system components. One or more remote, fixed, helm switch assemblies 1*a*, 1*b*, 1*c*, 1*d*, and/or a remote, hand held unit 1*e*, are connected by electrical cable to an electrical panel 2. Electrical panel 2 is connected to electric solenoid control valve assemblies 3 by electrical cable and also to a control hydraulic pump 4 and a steering hydraulic pump 6 with additional electrical cables and connectors. Fluid pressure supplied by hydraulic pump 4 is piped to the control valve assemblies 3. The solenoid valves making up a valve assembly 3 are operated remotely by the helm switch assemblies la through 1e, which control the supply of electrical energy through electrical panel 2 to the solenoid valves in valve assembly 3. When activated to an open position, the solenoid valves supply hydraulic fluid pressure that moves the pistons in engine throttle control cylinder 5*a* and transmission shift control cylinder 5*b* on each engine, thereby moving the corresponding engine throttle and transmission shift control levers.

Switch assemblies attached to throttle and transmission shift control cylinders 5*a* and 5*b*, and activated by movement of the pistons in control cylinders 5*a* and 5*b*, are wired through electrical control panel 2 to the solenoid valves in valve assemblies 3 in order to control the solenoid valves that control the supply of hydraulic fluid to the control cylinders.

Steering may be performed at any of the remote helm locations 1*a* through 1*e* with a switch that is connected through terminals on electrical panel 2 to relays for hydraulic steering pump 6. Alternately or concurrently, another switch assembly may be energized by mechanical or manual hydraulic steering devices in order to actuate the steering hydraulic pump 6 and supply hydraulic fluid to the steering cylinder 7. The switches are connected to steering pump 6 through panel 2 and are mounted on cylinder 7. The schematic diagram of FIG. 2 illustrates the electrical and hydraulic connections between the components of an embodiment of a boat control system such as shown in FIG. 1, with the added depiction of solenoid valve assemblies and control cylinders for operating port and starboard engines.

The illustration of FIG. 1 depicts an inboard engine installation on a sport fisherman type of boat. Although this arrangement may be one of the best applications of the invention, the use is not restricted to this installation. The invention may be used on any type boat or ship with any propulsion system. This includes but is not limited to inboard straight drive or "V" drive, outboard, inboard/outboard or stern drive, pump drives or other drive types.

Drawings in this application illustrate embodiments of a boat control system appropriate for the control of one or more engines, and a second engine is included in some of the drawings in order to describe how multiple engines relate to the invention. There is no restriction on the number of engines in a single vessel that may be controlled by the system described and claimed in the current application.

DETAILED DESCRIPTION OF THE PREFERRED EMBODIMENTS OF THE INVENTION

Figure 3:
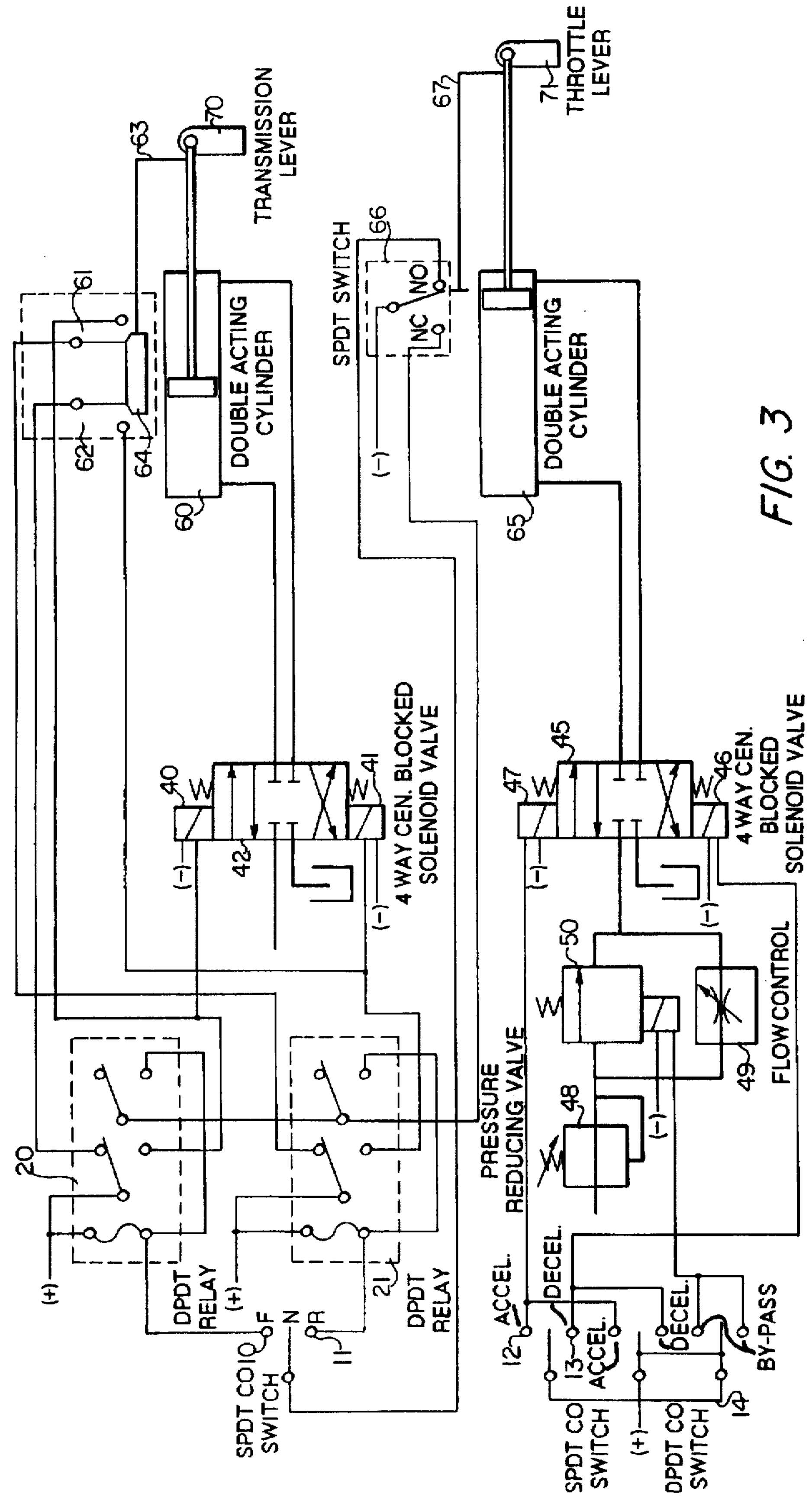
FIG. 3 is an electrical and hydraulic schematic diagram showing the interconnection of the principle components providing transmission control and throttle control in one embodiment of the system.

Referring first to FIG. 3 for an understanding of how an embodiment of the current invention achieves transmission gear shifting, a single-pole double-throw switch with switches 10 and 11 is mounted at one of the remote helms and is closed in one direction to shift the transmission to a forward position by energizing a double-pole, double-throw relay 20. Activation of switch 10 to the forward position causes solenoid 40 on four way center blocked valve assembly 42 to consequently move valve assembly 42 from a center blocked position to an open position. Hydraulic fluid pressure is supplied to the front side and bled from the back side of a double acting hydraulic transmission shift control cylinder 60 when solenoid 40 is energized, thereby retracting the piston into cylinder 60.

As shown in FIG. 3, limit switches 61 and 62 are mounted on cylinder 60 to be activated by travel of the piston, as conveyed through a control rod 63, to the right or left of its center position, respectively. As the cylinder 60 is retracted, control rod 63 connected to the cylinder causes switch guide 64 slidably mounted on cylinder 60 to close switch 62. Subsequently, when switch 10 at one of the remote helms is opened and returned to its neutral position, relay switch 20 is deenergized, thereby supplying power through switch 62 to energize solenoid 41 on four-way valve assembly 42. Hydraulic fluid is consequently supplied to the back side of the shift control cylinder 60 while bleeding hydraulic fluid from the front side of cylinder 60 to a reservoir, thereby extending the piston from cylinder 60 and opening switch 62.

When the engine throttle is in any position other than the idle position, with the idle position being illustrated in FIG. 3 as the extreme right position of the piston in cylinder 65, throttle control switch 66 remains in a normally open position and no current is supplied through switches 10 or 11 to the double-pole double-throw relay solenoids 20 and 21. Therefore the relay solenoids 20 and 21 remain closed, thus retaining the four-way center blocked valve assembly 42 in its center blocked position so that no hydraulic fluid is supplied to either side of the shift control piston in cylinder 60 and the transmission is prevented from being shifted into gear.

With the engine throttle in the idle position, when switch 10 is opened and returned to the neutral position from a forward position, and switch 62 is closed as a result of the shift control piston having been moved to the left in FIG. 3, solenoid 41 on valve assembly 42 is activated so that hydraulic fluid is supplied to the back side of the piston of cylinder 60 and returned to the reservoir from the front side of the piston thereby moving the piston to the right in FIG. 3. Movement of the piston to the right in FIG. 3 opens switch 62 and de-energizes solenoid 41 on valve assembly 42. The cylinder piston is thus centered placing the shift lever of the transmission in a neutral position.

To operate the transmission in reverse, with the engine throttle in its idle position, switch 11 is closed to a reverse position (down in FIG. 3), thereby energizing relay 21, which then energizes solenoid 41 on valve assembly 42 to supply fluid pressure to the back side of the piston of cylinder 60. As the cylinder is extended, control rod 63 causes switch guide 64 to slide to the right and engage and close switch 61. When switch 11 is opened and returned to the neutral position from the reverse position, power passes through closed switch 61 and energizes solenoid 40 on valve assembly 42. With solenoid 40 energized, hydraulic fluid is supplied to the front side of the piston of cylinder 60 long enough to open switch 61 again, deenergize solenoid 40 and return the shift cylinder 60 to its center, neutral position. As described above, the normally open contact of engine throttle switch 66 must be closed, with the engine throttle in the idle position, in order to allow either relay 20 or 21 to provide power to either solenoid 40 or 41 respectively, so that valve assembly 42 can be moved from its center blocked position.

Activation of solenoid 40 by the closing of switch 61 and the return of switch 11 to its neutral position, as described above, results in the supply of hydraulic fluid to the front side of the piston of cylinder 60, thus retracting the piston until switch 61 is opened. With switch 61 opened, power is no longer provided to solenoid 40, so four way solenoid valve assembly 42 returns to its center blocked position. With solenoid valve assembly 42 in the center blocked position the piston in cylinder 60 is locked in the central position and the transmission shift lever is maintained in a neutral position.

As long as switches 10 and 11 are open and in the neutral position, and relays 20 and 21 are not activated, the springs in solenoids 40 and 41 keep solenoid valve assembly 42 in its center blocked position, thereby preventing the flow of hydraulic fluid to or from cylinder 60 and preventing any movement of the piston or the transmission shift lever.

Figure 5A:
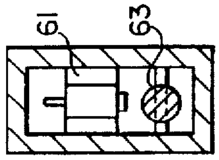
FIG. 5A is a cross sectional view taken along arrows 5A—5A of FIG. 5.
Figure 5:
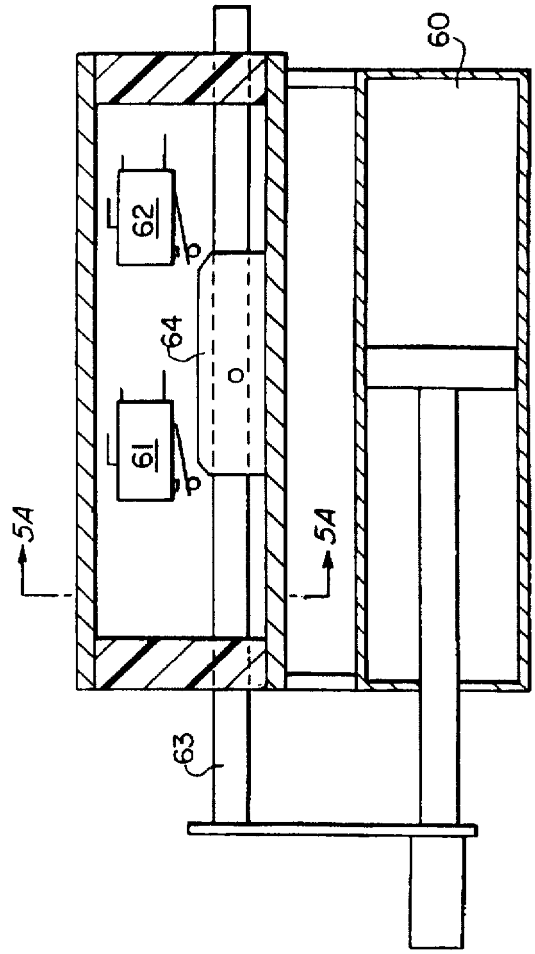
FIG. 5 is a side elevation view in partial cross section showing the shift cylinder switch control unit.

An embodiment of the switch assembly containing switches 61 and 62 is illustrated in FIG. 5. Switch guide 64 is connected to control rod 63 and slides parallel to the axis of cylinder 60.

Referring to FIG. 3, hydraulic cylinder 65 is shown as a throttle control cylinder. When in an extended position, the throttle lever of the engine is in the idle position and the normally open contact of single pole double throw switch 66 is in the closed position as a result of activation by control rod 67.

Switch 66 supplies current to switches 10 and 11 when its normally open contact is closed by the movement of the piston in cylinder 65 to the right in FIG. 3, and hence the movement of control rod 67 to the right in FIG. 3. If the normally open contact of switch 66 is not closed by control rod 67 it is not possible to energize relay 20 or 21 through switches 10 or 11, which in turn prevents the supply of power to solenoids 40 and 41 on valve assembly 42 to shift the transmission.

When switch 10 is closed to the forward position, and the transmission shift lever has been moved to a forward position; and the normally closed contact switch of 66 is closed as a result of the engine throttle being accelerated, relay 20 actuates solenoid 40 to hold the shift cylinder 60 in a retracted position which corresponds to the forward position of the transmission.

When switch 11 is closed to the reverse position, and the transmission shift lever has been moved to a reverse position; and the normally closed contact switch of 66 is closed as a result of the engine throttle being accelerated, relay 21 actuates solenoid 41 to hold the shift cylinder 60 in an extended position which corresponds to the reverse position of the transmission. It is therefore not possible to de-energize switch 10 or 11, or de-energize solenoid 40 or 41 to disengage the forward or reverse gears and shift transmission lever 70 when the throttle cylinder 65 is not in an extended or idle position with the normally open contact of switch 66 being closed.

As illustrated schematically in FIG. 3 relative to engine speed throttle control, the throttle of an engine is controlled by switch contact 12 to increase and switch contact 13 to decrease engine speed. Double pole double throw switch 14 in combination with switch 12 or 13 provides a means for achieving more rapid acceleration or deceleration of engine speed. When switch 12 is closed, solenoid 47 on valve assembly 45 is energized to shift valve assembly 47 from a center blocked position to a position wherein fluid is provided to the front side of the piston of cylinder 65 to retract the piston and move the connected throttle lever 71 to accelerate the engine. The fluid flow to cylinder 65 is restricted by pressure reducing valve 48 and, when additional restriction is desired, flow control valve 49.

Switch 14 is used in conjunction with switch 12 to energize solenoid 44 on valve 50 and solenoid 47 on valve 45 to position four way valve 45 and open normally closed bypass flow valve 50 providing increased flow to the cylinder 65 and a more rapid movement of the throttle lever.

Closing switch 13 energizes solenoid 46 on four way valve 45 to shift the valve from a center blocked position to provide fluid pressure to the rear of the piston of cylinder 65 to extend the piston rod connected to the engine throttle lever to decelerate the engine speed. The closing of switch 14 in conjunction with switch 13 energizes solenoid valve 44 to again bypass the flow control valve 49 to increase the flow of fluid, resulting in a faster movement of the piston rod and connected throttle lever.

Figure 12A:
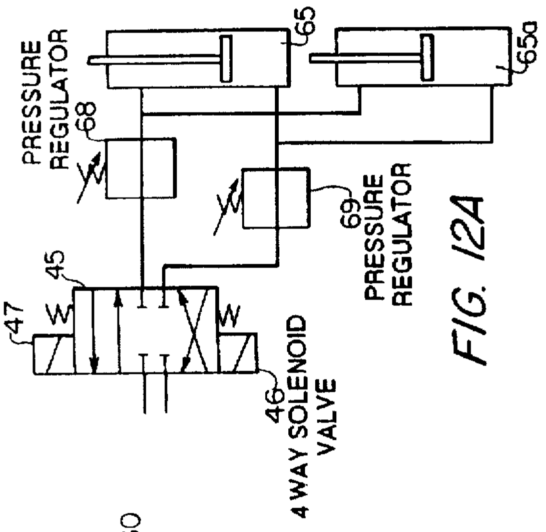
FIG. 12A is a hydraulic schematic diagram for one variation of the boat control system shown in FIG. 12 using an additional hydraulic control cylinder to position the throttle control lever.
Figure 12:
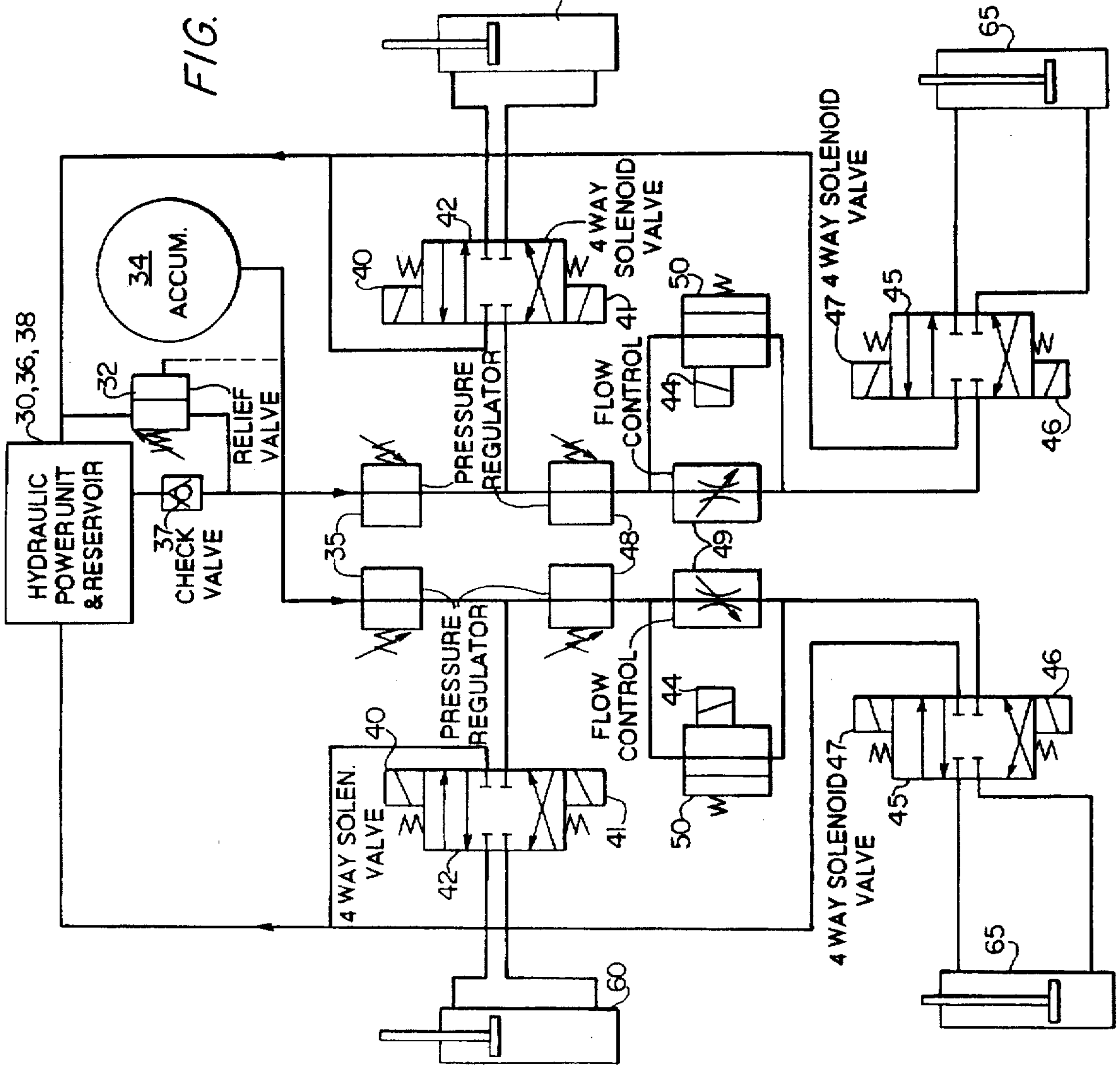
FIG. 12 is a hydraulic schematic diagram for the boat control system.

When switches 12 and 13 are open, the springs of the valve 45 return it to a center blocked position, thus blocking the flow of hydraulic fluid to or from cylinder 65 and preventing any movement of the piston due to outside pressures. The use of four 2-way solenoid valves or two 3-way solenoid valves with two check valves for each valve may be substituted for either of the 4-way valves 42 or 45 used in the embodiments discussed above. FIG. 12 is a hydraulic schematic diagram of the hydraulic system of the invention.

Figure 4:
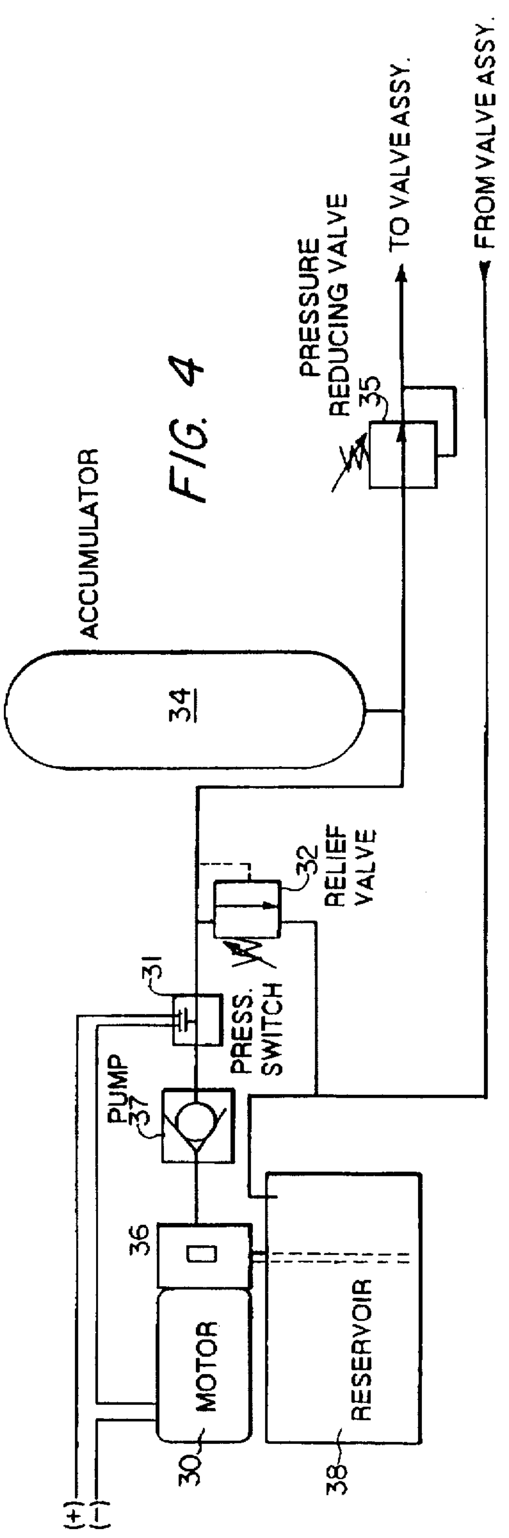
FIG. 4 is a schematic diagram showing the principle components of the hydraulic pressure supply portion of the system for throttle and transmission control.

As illustrated schematically in FIG. 4, fluid pressure is supplied to the previously described valve assembly 3 (including 4-way valves 42 and 45) in FIG. 1 and FIG. 2 by means of a hydraulic pump. The motor 30 powering pump 36 is controlled by a pressure switch 31 to maintain a desired pressure range. A check valve 37, is included to maintain pressure in the system when the pump is not operating and prevent fluid from returning to reservoir 38 from the pressure line. A pressure relief valve 32, is connected to the pressure side of the system to prevent over pressurization in the event of failure of the pump to shut off at the desired pressure. Hydraulic fluid relieved as a result of over-pressurization is directed back to the reservoir 38.

To reduce cycling of the pump as demand for pressurized hydraulic fluid fluctuates, a pressurized accumulator 34 is included in the system. The pressure and return lines are then connected to the valve assembly containing valves 42, 45, 48, 49, and 50. A pressure reducing valve 35 is connected upstream of the valve assembly in order to reduce operating fluid pressure. One valve assembly is used for each engine and a separate pressure reducing valve is used for each valve assembly. An engine driven hydraulic pump with solenoid valves to be controlled by a pressure switch may be used in place of an electrically powered pump.

Figures 7, 7A, 7B, 8, 8A, 8B:
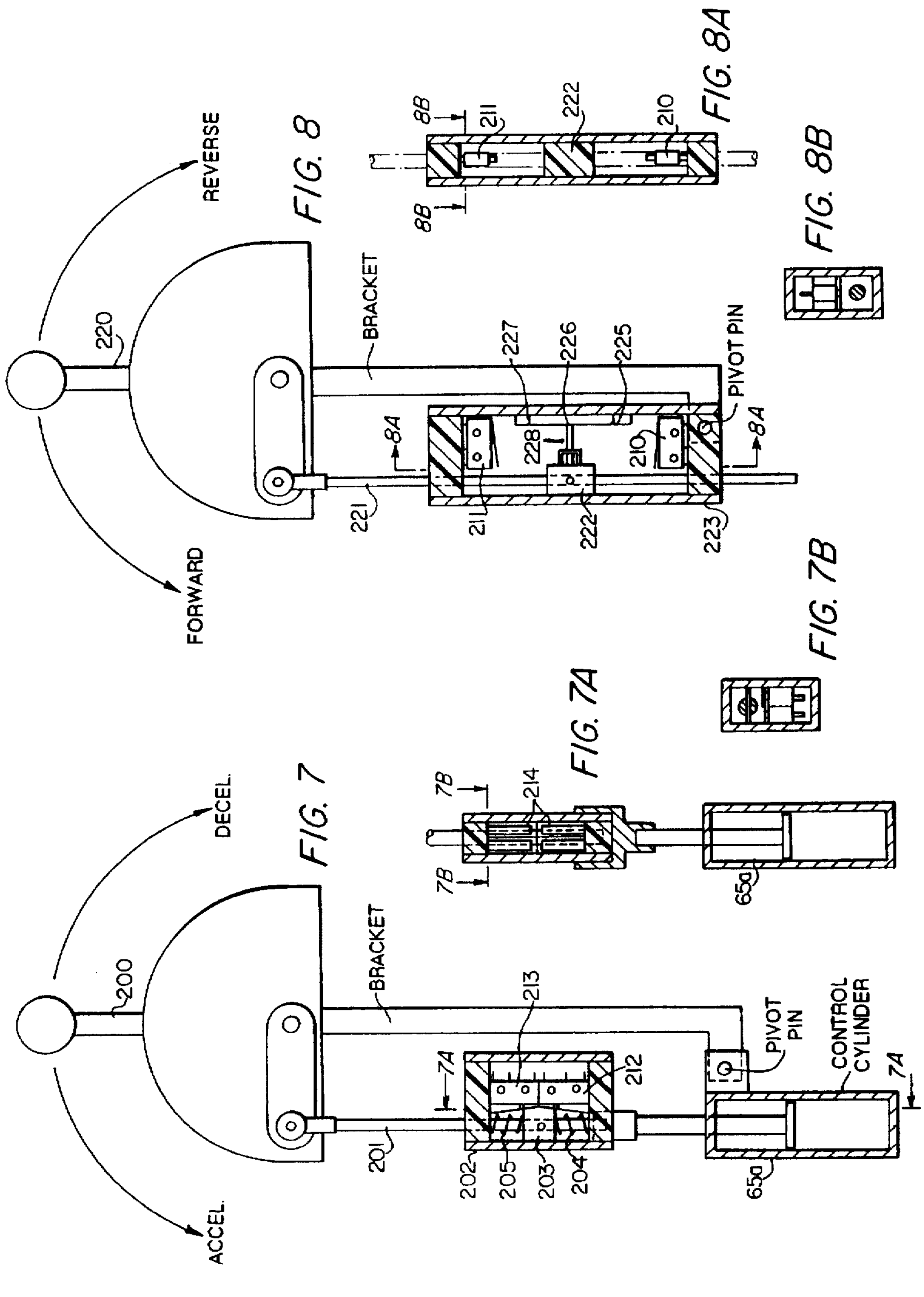
FIG. 7 is a cross sectional view of one embodiment of the throttle control cylinder switch having a lever-type control.
FIG. 7A is a cross sectional view taken in the direction of arrows 7A—7A in FIG. 7.
FIG. 7B is a cross sectional view taken in the direction of arrows 7B—7B in FIG. 7A.
FIG. 8 is a cross sectional view of one embodiment of the transmission shift control switch having a lever-type control.
FIG. 8A is a cross sectional view taken in the direction of arrows 8A—8A in FIG. 8.
FIG. 8B is a cross sectional view taken in the direction of arrows 8B—8B in FIG. 8A

FIG. 7 illustrates an alternate throttle switch configuration in which the switch is provided with a control lever that can be moved similarly to the movement of a conventional engine throttle lever. Switches 212, 213, and 214 perform the same functions as switches 12, 13 and 14 described above and illustrated in FIG. 3. The throttle of an engine is controlled by switch 212 to increase and switch 213 to decrease engine speed.

As lever 200 is moved forward, or to the left in FIG. 7, rod 201 is advanced through switch enclosure 202, or downward in FIG. 7, and cam 203 engages switch 212 to accelerate the engine. Additional references not illustrated in FIG. 7 have been previously illustrated in FIG. 3.

When switch 212 is closed, solenoid 47 on valve 45 is energized to shift valve 45 from a center blocked position to provide fluid to the front side of the piston of cylinder 65 to retract the cylinder and move the connected throttle lever 71 to accelerate an engine.

In an embodiment wherein additional control of the engine throttle is desired a lever type throttle control switch such as shown in FIG. 7 can be used in conjunction with engine throttle control switches 12, 13, and 14. Acceleration of engine throttle speed is achieved by directing hydraulic fluid in parallel to the front sides of cylinders 65*a* and 65, as shown in FIG. 12A. A pressure reducing valve 48 and flow control valve 49 are provided upstream of 4-way valve 45 for each engine. Hydraulic schematics FIGS. 12 and 12A illustrate the placement of these valves in the system. Additional pressure reducing valves 68 and 69 are placed in the pressure supply and return lines to and from cylinders 65 and 65*a* in order to cause their respective pistons to move simultaneously.

During acceleration or deceleration of engine speed, as speed, as controlled by lever 200, added pressure on lever 200 after moving it far enough to activate either switch 212 or 213, compresses spring 204 or 205 and allows cam 203 to close switch 214. Switch 214 is used in conjunction with switch 212 to energize solenoid 44 on valve 50 and solenoid 47 to reposition four way valve 45 and open normally closed bypass flow valve 50, providing increased flow to cylinders 65 and 65*a* for more rapid movement of the engine throttle lever.

As the lever 200 is moved to the right in FIG. 7, rod 201 is retracted from switch enclosure 202, causing cam 203 to close switch 213. With switch 213 closed, solenoid 46 on four way valve 45 is energized and four way valve 45 is shifted from a center blocked position to a position that provides fluid pressure to the rear of the pistons of cylinders 65 and 65*a*, thereby extending the cylinder rod connected to the engine throttle lever 71 to decelerate the engine speed. Increasing pressure on lever 200 compresses spring 205, permitting the closing of switch 214 in conjunction with switch 213. Solenoid valve 44 on valve 50 is activated by the closure of switch 214, thereby bypassing the flow control valve 49 to increase the flow of hydraulic fluid to cylinders 65 and 65*a*, resulting in faster movement of the piston rod and connected throttle lever.

When lever 200 is released, spring 204 or 205 disengages cam 203 from switch 212 or 213, causing them to open. Valve 45 then returns to a center blocked position, locking the fluid in cylinders 65 and 65*a*, thus preventing any movement of the cylinders or the throttle lever due to outside pressures. The speed of the engine attained at the time lever 200 is released remains the same until changed by movement of the lever.

The hydraulic schematic diagram FIG. 12A incorporates two additional pressure regulating valves 68 for cylinder 65 and 69 for cylinder 65*a* to equalize the flow to each cylinder to cause them to move simultaneously. A flow equalizer or flow control valves may be substituted for pressure regulating valves 68 and 69. If the pistons of cylinders 65 and 65*a* become out of synchronization, holding pressure on lever 200 in a full acceleration or full deceleration position will reposition both pistons in a fully extended or retracted position to return them to synchronization. The use of four 2-way solenoid valves or two 3-way solenoid valves with two check valves for each valve may be substituted for either 4-way valves 40 and 45 used in the valve assembly.

FIG. 8 illustrates an embodiment of the present invention having a lever type transmission shift control. Switches 210 and 211 perform the same functions as switches 10 and 11 in FIG. 3. Additional references not illustrated in FIG. 8 have been previously illustrated in FIG. 3. Lever 220 is connected through rod 221 to advance or retract guide 222 in switch assembly enclosure 223. Spring loaded roller 228 on guide 222 engages detent 226 to maintain a centered position of guide 222 and lever 220. When lever 220 is moved forward, guide 222 engages switch 210 to energize solenoid 40 on four way valve 42 to place the transmission in a forward gear position. The same sequence of operations occurs as previously described for switch 10 regarding throttle switch 66 and transmission shift switches 62 and 61. Detent 225 maintains the guide 222 and the lever in this advanced position.

When lever 220 is moved rearward from this advanced position, switch 210 is opened and solenoid 40 on valve 42 is de-energized. When lever 220 is moved to a rearward position, guide 222 is retracted to engage switch 211, thereby energizing solenoid 41 on valve 42 to shift the transmission into a reverse gear position. The same sequence of operations occurs as previously described for switch 11 regarding throttle switch 66, and transmission shift switches 62 and 61. Detent 227 maintains guide 222 and the lever 200 in this retracted position.

When lever 220 is moved forward again switch 211 is opened and solenoid 41 on valve 42 is de-energized. Switches 61 and 62 located on transmission cylinder 60 operate in the same manner as previously described in reference to FIG. 3 to return cylinder 60 to a mid or neutral position when switches 210 and 211 are open.

Figure 9:
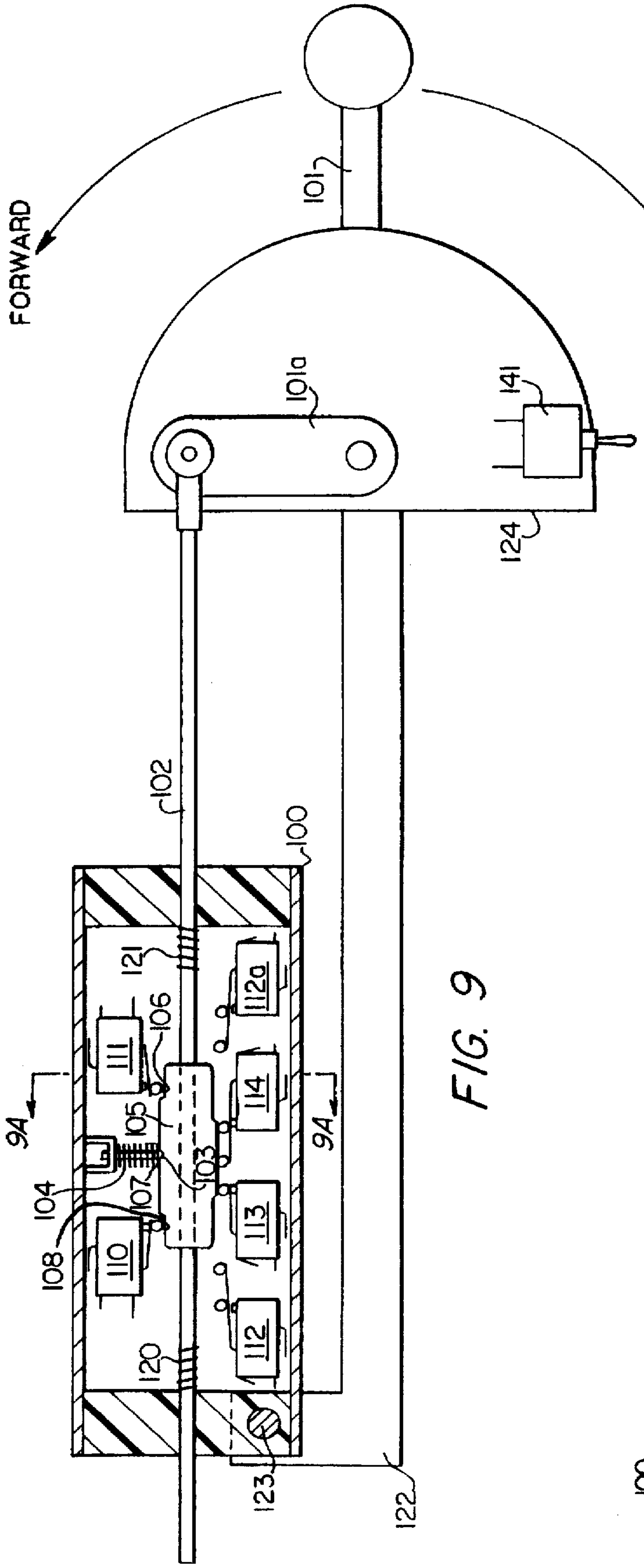
FIG. 9 is a cross sectional view of one embodiment of the throttle control cylinder switch and the transmission shift control switch combined into a single assembly having a single lever-type control.
Figure 9A:
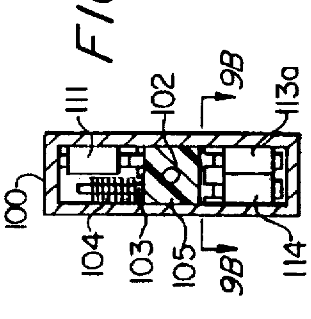
FIG. 9A is a cross sectional view taken in the direction of arrows 9A—9A in FIG. 9.
Figure 9B:
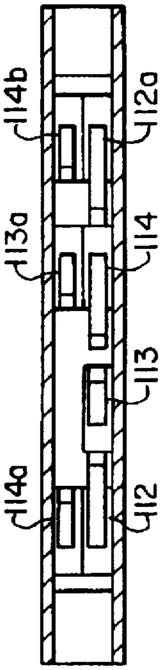
FIG. 9B is a cross sectional view taken in the direction of arrows 9B—9B in FIG. 9A.

FIG. 9 illustrates a further embodiment of the present boat control system with a single lever switch operator operating both throttle and transmission shift switches from a single fixed helm position. Additional references not illustrated in FIG. 9 have been previously illustrated in FIG. 3. A lever 101 is connected to a control rod 102 through lever 101*a*. Control rod 102 is slidably mounted along the central axis of switch assembly 100. A guide 105 attached to control rod 102 engages switches 110, 111, 112, 112*a*, 113, 113*a*, 114,114*a* and 114*b* as it moves in each direction. These switches have the same functions as switches 10, 11, 12, 13, and 14 previously illustrated in FIG. 3.

Roller 103 compressed by a spring 104 rides along the guide 105 and engages detents 106, 107 and 108 respectively so as to provide an indication of transmission shift positions forward, neutral and reverse. A center position of lever 101 positions switch guide 105 in a centered location in switch assembly 100 engaging detent 107. In this position, switches 114, 113 and 113*a* are closed. These switches activate solenoid 46 on valve 45 and solenoid 44 on valve 50 to rapidly decelerate the engine throttle speed, bypassing flow control valve 49.

Forward movement of lever 101, moves guide 105 to the left in FIG. 9, closing switch 110 to activate the forward shift solenoid 40 on valve 42 while maintaining closure of switch 113 to keep the engine at idle speed and engaging roller 103 in detent 106. Additional forward movement compresses spring 120 against the inner left end of switch assembly 100, allowing guide 105 to close switch 112 and open switch 113, thereby energizing solenoid 47 on valve 45 and deenergizing solenoid 46 to accelerate the engine. Additional forward movement of lever 101 causes guide 105 to further compress spring 120, and closes switch 114*a* along with 112 to activate solenoid 44 on bypass valve 50, thereby providing rapid response of the throttle.

When pressure to control lever 101 is removed, spring 120 returns guide 105 to the detent 106 of the forward shift position. The speed attained by the engine at this point is maintained until changed by movement of the lever.

As the control lever 101 is moved from the forward shift position rearward towards the center, switch 113 is closed again to energize solenoid 46 on valve 45 to operate the deceleration mode of the throttle system. Additional rearward movement of lever 101 toward the center position opens switch 110 to deenergize solenoid 40 on valve 42 and return valve 42 to a center blocked position. Further movement to the neutral position activates switch 114 again, thereby energizing solenoid 44 on bypass valve 50 to open this bypass valve and increase the engine deceleration speed. The opening of switch 110, deenergizing of solenoid 40, and shifting of the transmission from a forward position to a neutral position cannot take place until solenoid 46 on valve 45 has been energized by the closing of switch 113*a* for long enough to move the throttle cylinder to a fully extended position with the engine at idle speed, thus closing the normally open contact on switch 66 as previously described.

Rearward movement from the center position of the lever 101, closes switch 111, thereby activating the reverse shift solenoid 41 on valve 42 while maintaining closure of switch 113*a* to keep the engine at idle speed and engaging detent 108 with roller 103. Additional rearward movement compresses spring 121 to close switch 112*a* to energize solenoid 47 on valve 45 to accelerate the engine and opens switch 113 to deenergize solenoid 46 on valve 45. Additional rearward movement of lever 101 causes the guide 105 to further compress spring 121 to close switch 114*b* along with 112*a* to energize solenoid valve 44 on bypass valve 50 to provide increased flow and rapid response of the throttle along with positioning of valve 45 with solenoid 47. When pressure to the control lever is removed, spring 121 returns the guide 105 to the detent 108 of the reverse shift position. The achieved speed of the engine is maintained until changed by movement of the lever.

As the control lever 101 is moved from the reverse shift position forward towards the center, the normally open contact of switch 113*a* is closed to energize solenoid 46 on valve 45 to operate the deceleration mode of the throttle system. Additional forward movement toward the center position opens switch 111 to deenergize solenoid 41 on valve 42 and return valve 42 to a center blocked position. Further movement of lever 101 to the center, neutral position also closes switch 114 to energize solenoid 44 on bypass valve 50 to increase the engine deceleration speed and finally engage guide 105 with detent 107. With the engine returned to idle speed, the transmission returns to a neutral position. The transmission shift to neutral cannot take place until the throttle cylinder is in an extended position with the engine at idle speed as previously described by the opening of the normally closed contact on switch 66 and closing of the normally open contact.

A double pole single throw switch 141 can also be mounted to a housing 124 for lever 101 to interrupt the shift circuits to switches 111 and 112. This allows the lever to be advanced to increase the throttle without shifting the transmission to permit fast idle engine speed warm up in neutral gear.

Figure 10B:
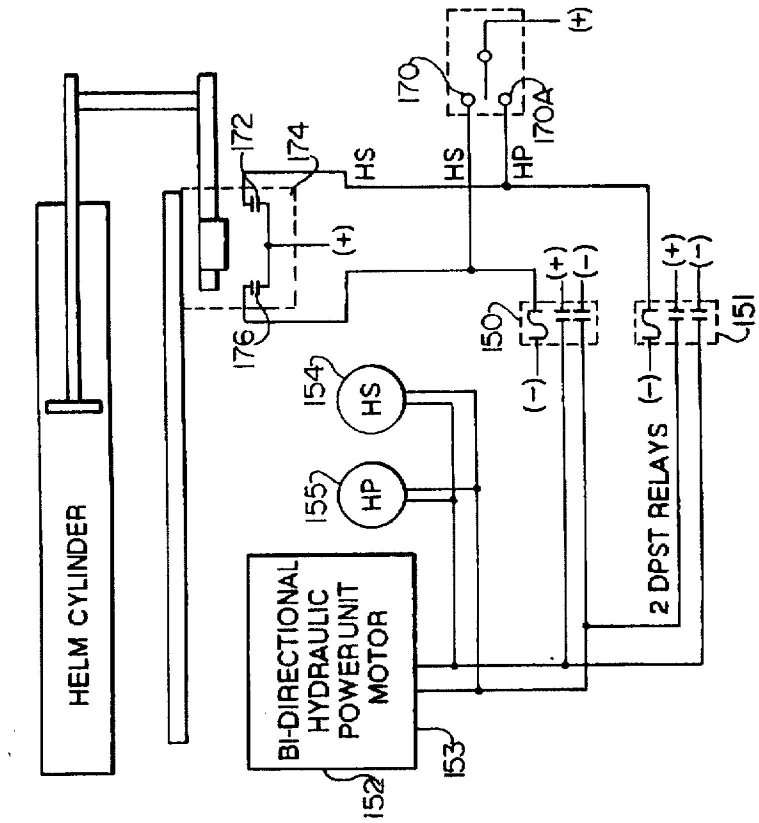
FIG. 10B is an electrical schematic diagram for the embodiment of the steering control portion of the system shown in FIG. 10A.
Figure 10A:
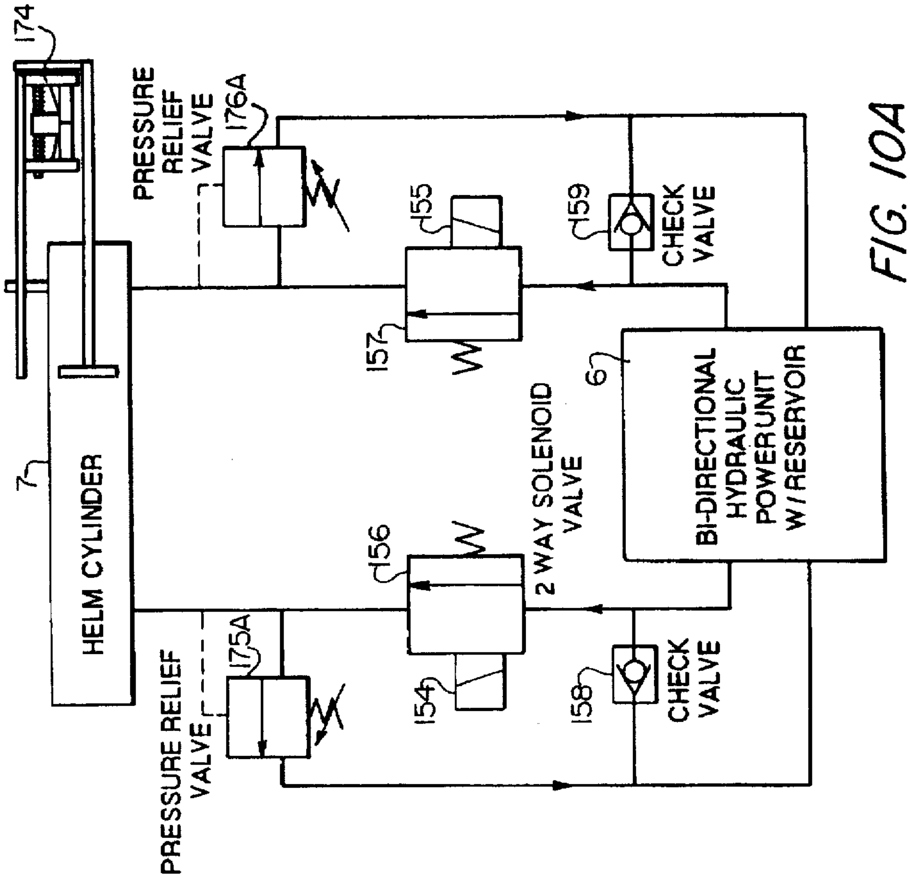
FIG. 10A is a hydraulic schematic diagram for one embodiment of the steering control portion of the system.
Figure 11:
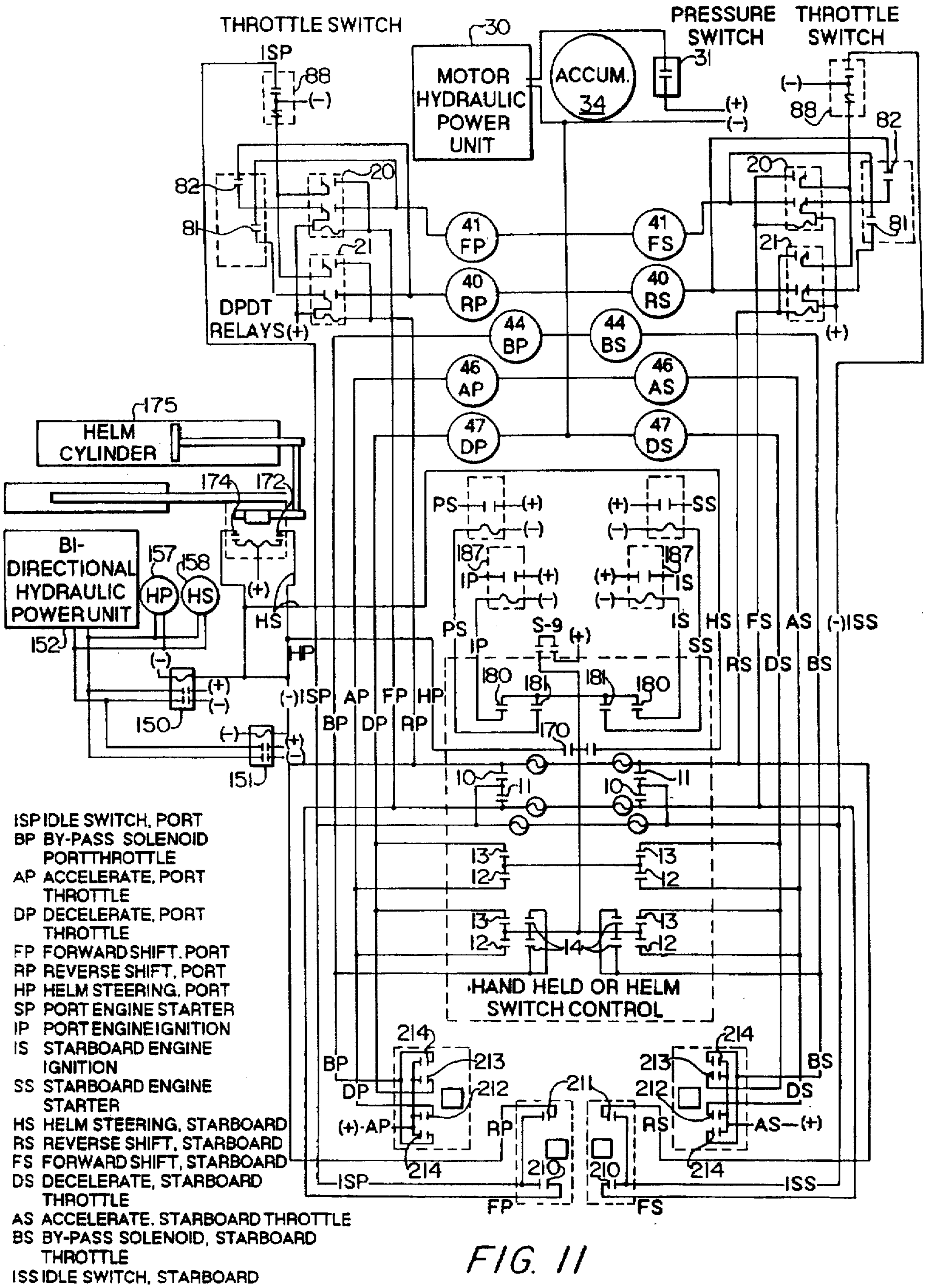
FIG. 11 is an electrical schematic diagram for the boat control system.

The schematic diagrams shown in FIGS. 10A and 10B illustrate the hydraulic and electrical interconnections for the steering portion of an embodiment of the present invention. The control of the steering cylinder is achieved with a separate hydraulic pump 153 that produces higher pressure and is independent from the pump used for engine and transmission controls. The steering pump motor 152 is controlled by relays 150 and 151 to reverse the direction of the pump motor 152. Relays 150 and 151 are double pole single throw, and function to energize solenoids 154 and 155 on normally closed two way valves 156 and 157. When these valves are closed the fluid in steering cylinder 7 is locked to prevent movement of the cylinder piston.

Pump 153 is bi-directional and supplies fluid to either side of the double acting piston in steering cylinder 7. Relay 150 is energized by a helm switch 170 located at a portable or stationary helm or control station; or relay 150 is activated by a guide closed switch 176 connected to a manual helm cable or cylinder. When relay 150 is energized pump motor 152 turns pump 153 in a clockwise direction and opens valves 156 and 157 to supply fluid to the back side of cylinder 7 and return fluid from the front side to the reservoir. The cylinder 7 then extends to move a lever or other device to rotate a rudder or propulsion unit to turn a vessel.

Relay 151 is energized by helm switch 170*a* located at a portable or stationary helm or boat control station; or relay 151 is activated by a guide closed switch 172 connected to a manual helm cable or cylinder. When relay 151 is energized pump motor 152 turns pump 153 in a counterclockwise direction and opens valves 156 and 157 to supply fluid to the front side of cylinder 7 and return the fluid from the back side to the reservoir. The cylinder 7 then retracts to move a lever or other device to rotate a rudder or propulsion unit to turn a vessel in the opposite direction. As the pump rotates, the fluid is prevented from returning to the reservoir by check valves 158 and 159. The system is protected from over pressurization by relief valves 175A and 176A.

Figure 13:
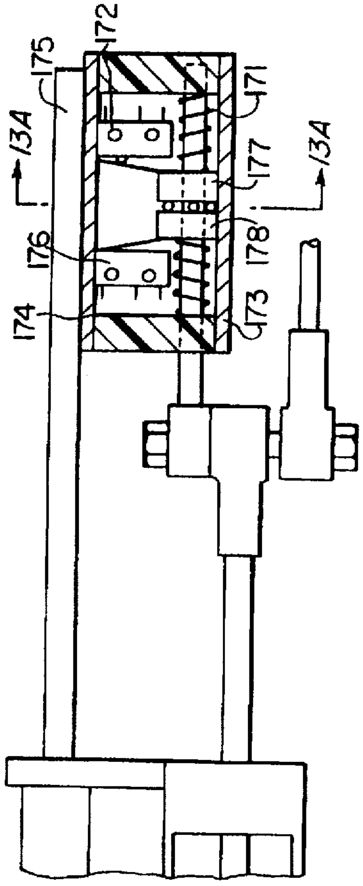
FIG. 13 is a sectional view of the steering control switch mounted on the steering cylinder.
Figure 13A:
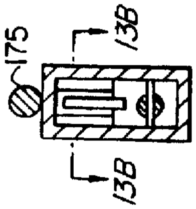
FIG. 13A is a cross sectional view taken in the direction of arrows 13A—13A in FIG. 13.
Figure 13B:
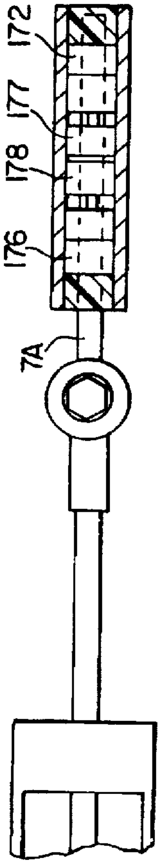

FIGS. 13, 13A and 13B illustrate an embodiment of the steering control portion of the boat control system wherein a special switch assembly converts the mechanical motion of a conventional push/pull steering device to an electrically controlled and hydraulically powered steering device such as illustrated in FIGS. 10 and 10A. A switch box assembly 174 is slidably mounted on a linked extension 7A of the piston rod extending from steering cylinder 7, and is fixedly mounted on the end of a push/pull rod 175. As the push-pull rod 175 is advanced, or moved to the right in FIG. 13, spring 173 is compressed and switch 176 is closed. This energizes relay 150 to extend cylinder 7 as previously described. As cylinder 7 extends, switch 176 remains closed by guide 178 while continuous pressure is maintained by push rod 175.

As the cylinder 7 continues to extend linked extension 7A moves in a like direction to relieve the compression of spring 173 and disengage switch 176 when pressure on linked extension 7A ceases. When push pull rod 175 is retracted, spring 171 is compressed to close switch 172 to energize relay 151 to retract cylinder 7 as previously described. As cylinder 7 retracts, switch 172 is closed by guide 177 and remains closed while continuous pressure is maintained by pull rod 175. As the cylinder 7 continues to retract, linked extension 7A moves in a like direction to relieve the compression of spring 171 and disengage switch 172 when pressure ceases. When no pressure is exerted on push-pull rod 175, spring 171 or 173 extends as linked extension 7A moves in a relative direction to open switch 172 or 176, thereby stopping the pump motor and the resulting flow of hydraulic fluid to cylinder 7 and closing valves 156 and 157.

Figure 14:
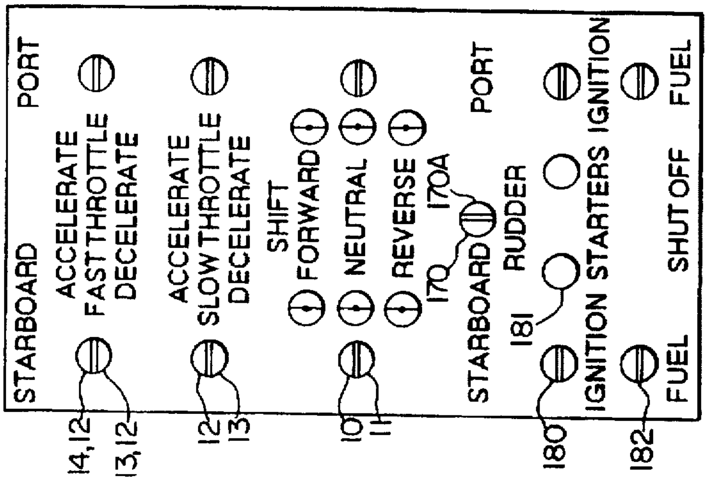
FIG. 14 is a plan view of a portable or fixed remote helm according to one embodiment of the invention for the control of the engine throttle, the transmission shifting, the steering functions, starting and stopping of a boat or ship.

FIG. 14 illustrates a boat control station according to one embodiment of the present invention. The boat control station can be a portable, hand held unit or a fixed unit mounted in various remote locations throughout the vessel. A double pole double throw, spring loaded center off switch for fast acceleration or deceleration speed of the throttle contains switch contacts 12, 13 and 14. A single pole, double throw, center off switch containing contacts 12 and 13 is for throttle control providing slow acceleration or deceleration of engine speed. A single pole, double throw, center off switch containing contacts 10 and 11 controls the movement of the transmission shift cylinder to provide forward, neutral and reverse positions. The function of these switches was previously described with reference to FIG. 3.

A single pole, double throw, spring loaded center off, switch contains the contacts for switches 170 and 170*a*, which control the relays 150 and 151 that control the hydraulic bi-directional pump and provide steering of the vessel. The function of these switches was earlier described in reference to FIG. 10.

Switch 182 controls relay 180 to provide ignition for the engine. Switch 183 controls relay 181 to engage the starter solenoid of the engine. Switch 184 de-energizes solenoid 185 on normally closed valve 186 to shut off fuel supply to a diesel engine. The relays controlled by these switches are illustrated in FIG. 6.

Figure 6:
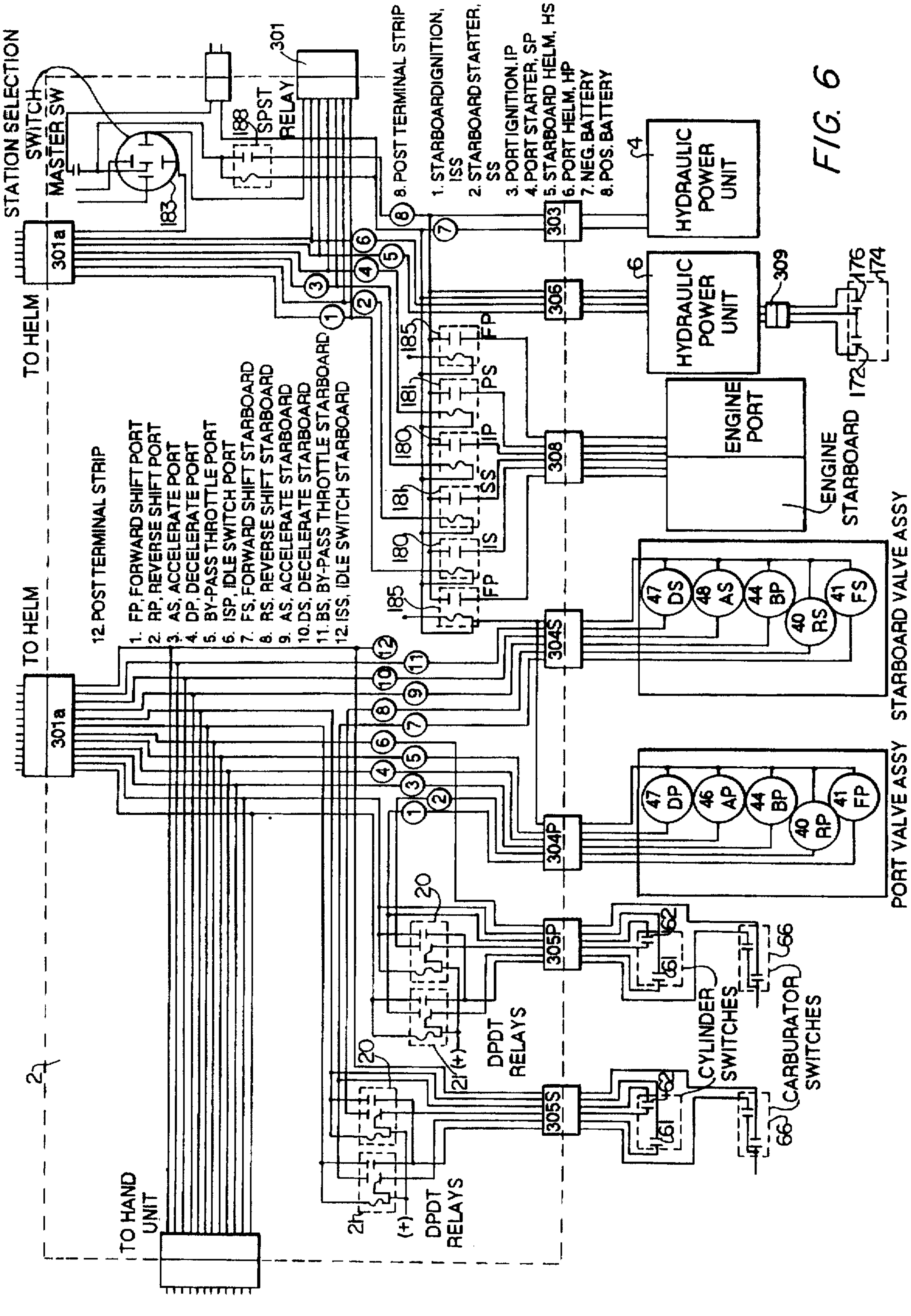
FIG. 6 is a schematic diagram of the electrical control panel showing the electrical interconnections for the various system components wired to the panel.

FIG. 6 is an electrical schematic illustrating the electrical interconnection of the various components making up the present invention. The individual modules that make up the boat control stations are connected by multiple conductor electrical cable and multipin connectors to an electrical panel having terminal blocks and relays. The valve assemblies 3 for each engine are connected by multiple conductor electrical cable to electrical panel 2 with multipin connectors 304S and 304P.

Switch assemblies 64 to position the shift cylinders 60 and throttle switches 66 are connected by multiple conductor electrical cable to electrical panel 2 with multipin plugs 305S and 305P. An engine control hydraulic supply is connected by multiple conductor electrical cable to electrical panel 2 with plug 303. A steering hydraulic supply module is connected by multiple conductor electrical cable to electrical panel 2 with plug 306. Steering control switch assembly 174, with switches 172 and 174, is connected to the steering hydraulic unit with plug 309. Engine starting and stopping functions are connected by multiple conductor electrical cable to electrical panel 2 with plug 308.

Ignition 180 and starter 181 relays are controlled by switches located at each helm for each engine. This allows starting and stopping of the engines in normal operation or in the event of an emergency or failure of a system. Relays are used in order to maximize the voltage available for the starter and ignition and are controlled by switches at each helm. This reduces the problem of voltage drops from lengthy wiring to remote stations and allows the active station to have control of stopping and starting the engines.

When diesel powered engines are used, an additional switch 184 is added to each helm for each engine to control relay 185 to open or close a two way normally closed solenoid valve to shut down the fuel supply. A selector switch 183 depicted in the electrical schematic FIG. 6 supplies power to the desired helm. Relay 188 is closed by a master switch to power the system.

What is claimed is:

1. A boat control system for controlling the operation of control components on a boat, said control system comprising:

a source of electrical power;

a source of pressurized hydraulic fluid;

electrical lines;

fluid transfer lines;

a first electric solenoid operated hydraulic valve;

a first hydraulic cylinder;

a control station;

a first electric relay being connected by said electrical lines to said control station;

said control station having a first electric control switch for controlling the supply of said electrical power to said first electric relay;

said first electric relay being connected by said electrical lines to said first electric solenoid operated hydraulic valve and controlling the flow of said electrical power to said first electric solenoid operated hydraulic valve;

said first electric solenoid operated hydraulic valve being connected by said fluid transfer lines to said source of pressurized hydraulic fluid and to said first hydraulic cylinder and controlling the flow of said pressurized hydraulic fluid to said first hydraulic cylinder;

said first hydraulic cylinder being connected to a means for moving one of said control components;

said first hydraulic cylinder being a double acting cylinder having a movable element;

said movable element having first and second sides;

said movable element extending from said cylinder when said pressurized hydraulic fluid is supplied to said first side of said movable element, and retracting into said cylinder when said pressurized hydraulic fluid is supplied to said second side of said movable element;

said first electric solenoid operated hydraulic valve having: a first position, wherein said pressurized hydraulic fluid is directed through said hydraulic valve and through said fluid transfer lines to said first side of said movable element when said hydraulic valve is in said first position; a second position, wherein said pressurized hydraulic fluid is directed through said hydraulic valve and through said fluid transfer lines to said second side of said movable element when said hydraulic valve is in said second position; and a third position, wherein said pressurized hydraulic fluid is blocked from passage through said hydraulic valve;

a second electric relay being connected by said electrical lines to said first electric solenoid operated hydraulic valve and controlling the flow of said electrical power to said first electric solenoid operated hydraulic valve;

said first electric control switch having a first closed position wherein said electrical power is supplied to said first electric relay to energize said first electric relay; a second closed position wherein said electrical power is supplied to said second electric relay to energize said second electric relay; and an open position wherein neither said first electric relay nor said second electric relay is energized.

2. The control system of claim 1 further including:

a first and a second limit switch associated with said first hydraulic cylinder;

means for closing said first and second limit switches, said means for closing being connected to said movable element;

said first limit switch being closed by maintaining said first electric solenoid operated hydraulic valve in said second position; said second limit switch being closed by maintaining said first electric solenoid operated hydraulic valve in said first position; and said first and second limit switches being open when said first electric solenoid operated hydraulic valve is in said third position and said first electric control switch is in its open position.

3. The control system of claim 2 further including:

a second electric solenoid operated hydraulic valve;

a second hydraulic cylinder, said second hydraulic cylinder having a movable element for connection to a second one of said control components;

a flow control valve;

said fluid transfer lines connecting said source of pressurized hydraulic fluid to said flow control valve, said flow control valve to said second electric solenoid operated hydraulic valve, and said source of pressurized hydraulic fluid to said second electric solenoid operated hydraulic valve;

means for supplying said pressurized hydraulic fluid directly to said second electric solenoid operated hydraulic valve; and means for diverting said pressurized hydraulic fluid through said flow control valve before said pressurized hydraulic fluid reaches said second electric solenoid operated hydraulic valve in order to provide more precise control of said second hydraulic cylinder.

4. A boat control system for control of drive train components on a boat, said control system comprising:

a source of electrical power;

a source of pressurized hydraulic fluid;

electrical lines;

fluid transfer lines;

a first electric solenoid operated hydraulic valve;

a first hydraulic cylinder;

said first electric solenoid operated hydraulic valve being connected by said fluid transfer lines to said source of pressurized fluid and to said first hydraulic cylinder and controlling the flow of said pressurized hydraulic fluid to said first hydraulic cylinder;

a control station;

first and second electric relays being connected by said electrical lines to said control station and to said first electric solenoid operated hydraulic valve;

said control station having a lever;

said lever being connected to a rod;

said rod extending into and being slidably supported by an enclosure;

said enclosure housing first and second switches;

said first switch controlling the supply of said electrical power to said first electric relay;

said second switch controlling the supply of said electrical power to said second electric relay;

said rod being connected to a cam wherein movement of said rod in a first direction causes said cam to actuate said first switch and movement of said rod in a second direction causes said cam to actuate said second switch.

5. A method for controlling a boat, said method comprising the steps of:

closing a first electric control switch;

directing electrical power through said closed first electric control switch to energize a first electric relay;

directing electrical power through said energized first electric relay to energize a first electric solenoid on a hydraulic valve;

actuating said hydraulic valve to a first open position by energizing said first electric solenoid;

providing pressurized hydraulic fluid through said open hydraulic valve in said first open position to actuate a hydraulic cylinder in a first direction providing a connection between said hydraulic cylinder and a control component on said boat;

moving said control component in a first direction by the actuation of said hydraulic cylinder in said first direction;

closing a first limit switch by actuating said hydraulic cylinder in said first direction;

opening said first electric control switch, thereby deenergizing said first electric relay;

directing electrical power through said deenergized electric relay and through said closed first limit switch to energize a second electric solenoid on said hydraulic valve;

actuating said hydraulic valve to a second open position by energizing said second electric solenoid;

providing pressurized hydraulic fluid through said hydraulic valve in said second open position to actuate said hydraulic cylinder in a second direction.

6. The method of claim 5 further including opening said first limit switch by actuating said hydraulic cylinder in said second direction;

moving said control component to a neutral position;

deenergizing said second electric solenoid;

biasing said hydraulic valve to a closed position.

7. The method of claim 6 further including:

closing a second electric control switch;

directing electrical power through said closed second electric control switch to energize a second electric relay;

directing electrical power through said energized second electric relay to energize said second electric solenoid on said hydraulic valve;

actuating said hydraulic valve to said second open position by energizing said second electric solenoid;

providing pressurized hydraulic fluid through said open hydraulic valve in said second open position to actuate said control component in a second direction by the actuation of said hydraulic cylinder in said second direction.

* * * * *